United States Patent [19]
Hayes et al.

[11] Patent Number: 5,737,880
[45] Date of Patent: Apr. 14, 1998

[54] RIGID, MULTI-PURPOSE GRILL COVER

[76] Inventors: Cedric M. Hayes, 1000 Clarksville Rd., Hermitage, Pa. 16148; Ronald Haag, 142 Coal Hill Rd., Greenville, Pa. 16125; Darren P. O'Neill, 117 Ridge Ave., Sharpsville, Pa. 16150

[21] Appl. No.: 753,390

[22] Filed: Nov. 26, 1996

[51] Int. Cl.$^6$ .................................................. B65D 85/00
[52] U.S. Cl. ...................... 52/79.1; 52/36.2; 52/DIG. 14; 150/165; D7/334; D7/402
[58] Field of Search ................................. 52/3, 36.2, 79.1, 52/DIG. 14; 312/208.3, 223.1; D7/334, 402; 150/154, 158, 164, 165

[56] References Cited

U.S. PATENT DOCUMENTS

| | | | |
|---|---|---|---|
| D. 298,406 | 11/1988 | Stephen et al. | D7/402 |
| D. 324,153 | 2/1992 | Wood | D7/402 |
| D. 377,136 | 1/1997 | Knuth | D7/402 |
| 1,749,177 | 3/1930 | Baxter et al. | 312/208.3 X |
| 4,178,977 | 12/1979 | Sur et al. | 52/3 X |
| 4,891,918 | 1/1990 | Wiley | 150/154 X |
| 4,894,961 | 1/1990 | Robbins | 52/DIG. 14 X |
| 5,245,801 | 9/1993 | Boesvert | 52/DIG. 14 X |

OTHER PUBLICATIONS

"Grill Covers", 1996 Grills & Accessories Brochure, The Thermos Company, p. 19, Aug. 1995.

*Primary Examiner*—Wynn E. Wood
*Assistant Examiner*—Laura A. Callo

[57] ABSTRACT

The present invention comprises a rigid, one-piece, lightweight, plastic and/or resin cover housing structure designed to accommodate and protect an outdoor barbecue grill positioned within. The shape of the grill covering allows for the shape of an outdoor grill and further allows for convenient use and storage. Furthermore, the grill covering provides additional food service and/or preparation space, and an apparatus whereby cooking utensils can be stored.

1 Claim, 4 Drawing Sheets

RIGID, MULTI-PURPOSE GRILL COVER

BACKGROUND OF THE INVENTION

1. Field of Invention

The field of invention relates to cover housing structure, and more particularly to a rigid, one-piece, lightweight, plastic and/or resin, multi-purpose grill covering, wherein the same is arranged to accommodate and protect a grill positioned therewithin.

2. Description of Prior Art

The popularity of outdoor barbecue grills has led to an increased need for protection for these grills. Exposure to extreme weather conditions has led grill owners to utilize various devices, such as canvas coverings and wooden casing, to protect their grills from these conditions. Also, the threat of children being injured by accidental, unintended contact with outdoor grills has led owners to utilize various precautionary devices, such as locks and chains, to ensure that children and other parties not intended to operate the grill cannot gain access to the grill. However, the aforementioned devices cannot provide complete, efficient, convenient, and economical protection from extreme weather conditions and use by children.

Canvas covering cannot in all cases protect the grill from large hail and debris blown by high winds; likewise, due to the flexible nature of canvas, children and other unintended parties are able to gain access to the grill by lifting the canvas or crawling underneath the canvas. Additional money must be spent on locks and/or chains or similar devices to prevent unintended use of these grills. Time must also be consumed opening and removing these locks and/or chains, and said devices can be unpleasant to view. Wooden casing can protect against most weather conditions, but also must be locked and/or chained to prevent unintended use. Furthermore, said casing can be heavy and difficult to assemble and/or position. In addition, said casing can be more expensive than many grill owners would want. The present invention sets forth a rigid, lightweight, one-piece structure that can protect against extreme weather conditions and that is designed to prevent children from gaining unintended access to the grill. In addition, the invention set forth provides for additional space for food preparation and/or service and apparatus for temporary and/or permanent storage of various cooking utensils. The present invention is convenient to use, inexpensive to produce, and pleasing to view.

Various other devices providing housing structure for outdoor grills have been set forth in the prior art, as exemplified by U.S. Pat. No. 5,245,801 to Boesvert, setting forth a relatively mobile rigid grill cover housing. Said device provides protection against extreme weather conditions, but the weight of such a structure could make it difficult to position, and the cost of a wooden structure may dissuade many grill owners. Also, exemplifying prior devices providing housing structure for outdoor grills is U.S. Pat No. Des. 324,153 to Wood, setting forth a barbecue grill cover in the shape of a football helmet. Again, though, the cost and maneuverability of such a device could be a barrier to many grill owners. Furthermore, grill owners not interested in football might not be inclined to purchase such a device.

Such devices demonstrate a clear need for improvement in the protection of outdoor barbecue grills. The present invention addresses these problems of protection from extreme weather conditions, unintended use by children, ease of use, cost effectiveness, and unpleasant appearances.

SUMMARY OF THE INVENTION

Due to the disadvantages inherent in the aforementioned known types of grill cover housing apparatus present in the prior art, the present invention (hereinafter referred to as "the present invention," "covering," or "grill covering") provides a rigid, one-piece, lightweight, plastic and/or resin, multi-purpose grill covering designed for positioning one outdoor barbecue grill therewithin. Therefore, the general purpose of the present invention, to be described subsequently in greater detail, is to provide a grill covering that is more efficient in providing protection for outdoor barbecue grills than are prior art grill cover devices.

In accordance with this purpose, the present invention provides a rigid, one-piece, lightweight, plastic and/or resin, multi-purpose grill covering which includes handles at the top of the covering, vents at the bottom corners of the front and rear walls of the covering, recessed food service and/or preparation surface at the top of the grill covering, recessed food service and/or preparation area on the two sides of the covering, recessed storage area for cooking utensils on the front wall of the covering, and sloped sides to permit easy storage and stacking.

The invention resides in the particular combination of these various features in one structure. The following summary distinguishes the present invention from any combination of the herein discussed characteristics of any prior art.

The following provides a general overview of the present invention, to be followed later with a detailed description of said invention. As many aspects of the present invention can be utilized as a basis for designing other structures, methods, and systems for carrying out the various purposes of the present invention, the following claims should be regarded as including equivalent structures insofar as they do not depart from the scope of the present invention.

This summary assumes that various specifics of the production of the present invention are subject to change. The size, shape, proportion, etc. of various aspects of the present invention may be altered in production, and the following claims should include such alterations insofar as they do not depart from the original scope of the present invention.

The first object of the present invention is to provide an efficient outdoor grill covering that provides adequate protection from extreme weather conditions, such as rain, snow, intense sun, high winds, and hail. The present invention provides a rigid, solid, plastic and/or resin covering which will provide protection from these extreme conditions for the outdoor grill positioned within.

Another object of the present invention is to prevent children from gaining unintended access to the grill. The rigid nature of the present invention provides that children cannot readily gain unintended access to the grill, as the rigid covering cannot be moved and manipulated as a canvas cover could be to permit a child to crawl underneath the covering. Also, the positioning of the handles by which the grill covering can be removed prevents children from gaining unintended access to the grill. The handles are positioned on all four sides of the covering, low enough that an adult could reach them and lift the covering over the grill, but high enough that a small child could not. Furthermore, the distance between the handles is too wide for small children to reach and therefore lift and remove the covering.

Another object of the present invention is to provide an easy-to-use grill covering that is light enough to be placed over the grill and removed from the grill by the owner. The lightweight plastic and/or resin body of the present invention allows for ease in positioning said grill covering. Also, he light weight of the covering allows for easy movement, transportation, and storage of said covering.

Yet another object of the present invention is to allow for a grill covering that is inexpensive to produce, in terms of both materials and labor costs. The plastic and/or resin body provides a low cost material, and the one-piece design allows for cost-efficient injection-mold production.

A further object of the present invention is to provide a lightweight, portable grill covering that is durable. Therefore, high-quality plastic and/or resin will be used, and the construction of said covering will allow for a design that provides maximum durability.

Still another object of the present invention is to provide the user additional food service and/or preparation space, as well as apparatus whereby various utensils can be stored. As such, the covering provides a recessed food preparation and/or service area at the top of the covering, two recessed areas on either side of the covering to provide preparation and/or service space, and a recessed compartment on the front wall with hooks to provide an apparatus for the temporary or permanent storage of cooking utensils.

A final object of the present invention is to provide a grill covering that is pleasing to look at and that can fit in with various other belongings of the owner of said grill covering. As such, the present invention will be provided in a variety of colors and styles and with a variety of potential decorations adorning the body of the present invention.

These and other objects of the present invention which characterize the novelty of the present invention, as well as the advantages thereof over existing prior art forms, will become apparent in the claims annexed to and forming part of this disclosure. The description that follows will help to better illustrate these claims.

BRIEF DESCRIPTION OF THE DRAWINGS

The drawings am designed to help the reader better visualize and understand the present invention. The description that follows makes reference to these figures.

DETAILED DESCRIPTION

Figure 1:
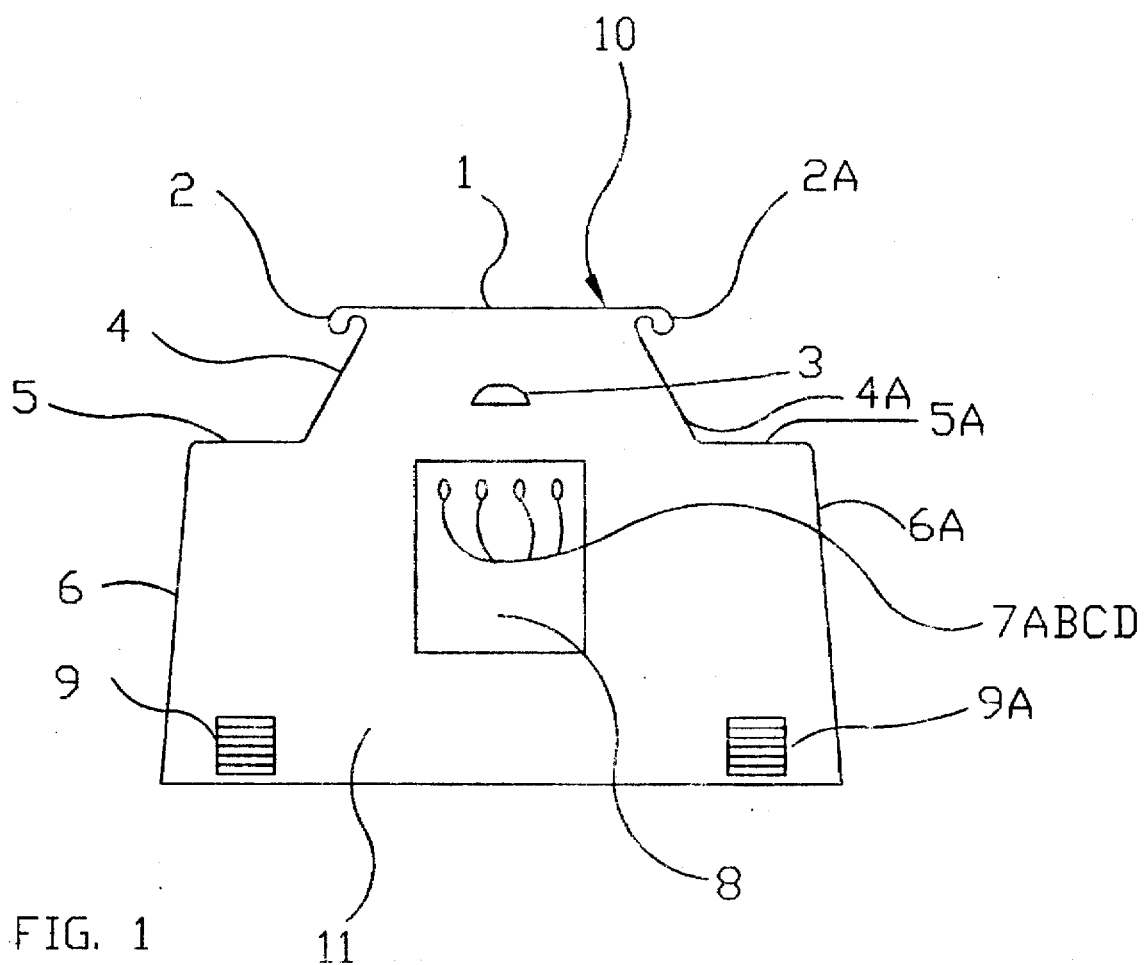
FIG. 1 is an isometric front view of the grill covering made in accordance with the concepts of the present invention.

A grill covering made in accordance with the concepts of the present invention is indicated generally by the numeral 10. Further description of the present invention will refer to FIGS. 1 through 4.

The grill covering 10 representing the present invention comprises a one-piece, solid plastic and/or resin structure with four walls at the base of 10. Side base walls 6 and 6a incline at a slight grade to allow for convenient stacking, positioning, and transportation of the covering. Front base wall 11 and rear base wall 11a are parallel and as conceived in the concepts of the present invention are embodied in the shape indicated in FIGS. 1 and 3, although an altered shape would not depart from the scope of the present invention. As the present invention calls for a one-piece structure, the aforementioned base walls 11, 11a, 6, and 6a, as well as the other sides and surfaces of the present invention, are encompassed as a single structure, thereby requiring no further attachment. Further, in accordance with the purpose of the present invention to increase child safety, the edges at which the aforementioned base walls meet are rounded.

Figure 2:
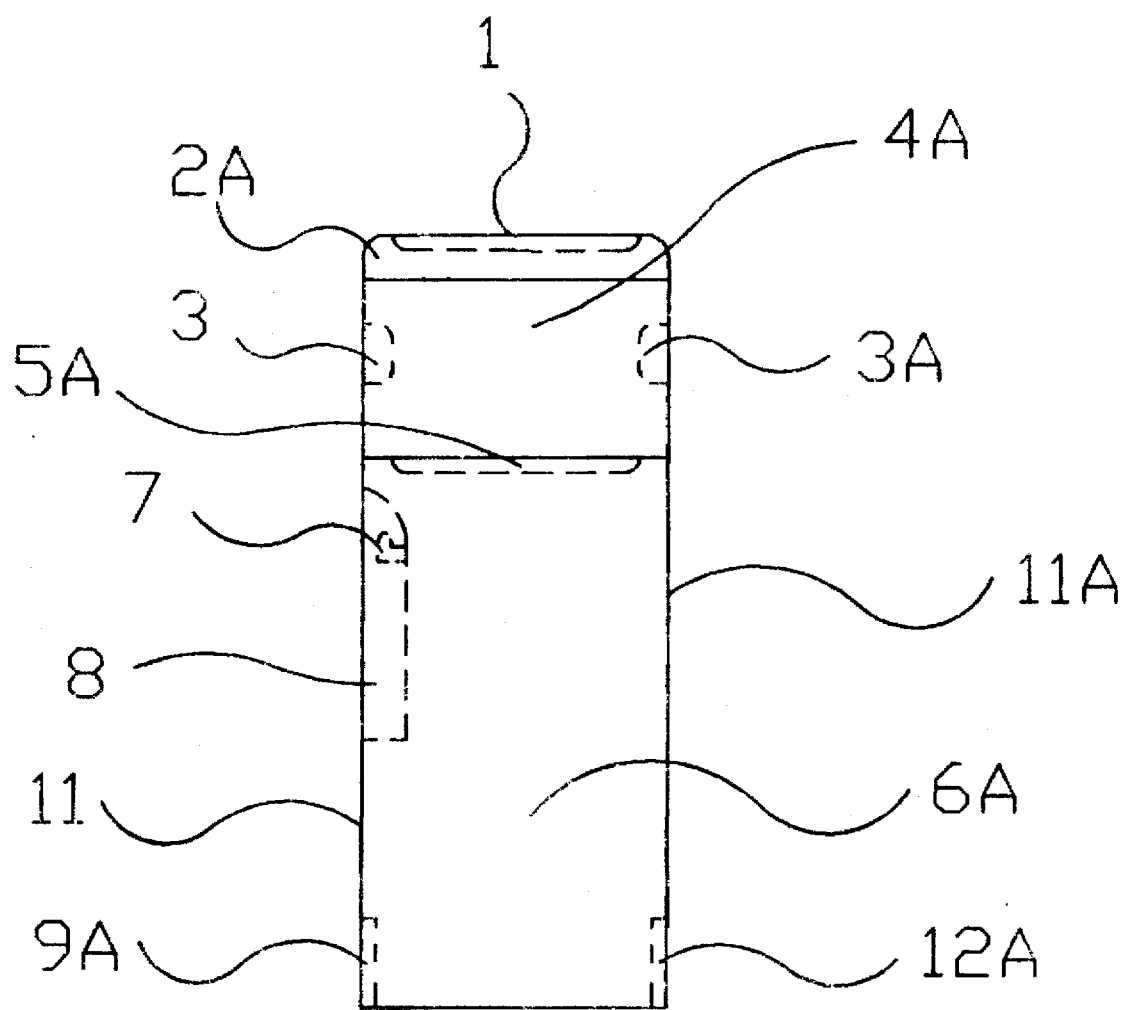
FIG. 2 is an isometric side view of the grill covering, with dotted lines representing areas of recession in the body of the grill covering.
Figure 3:
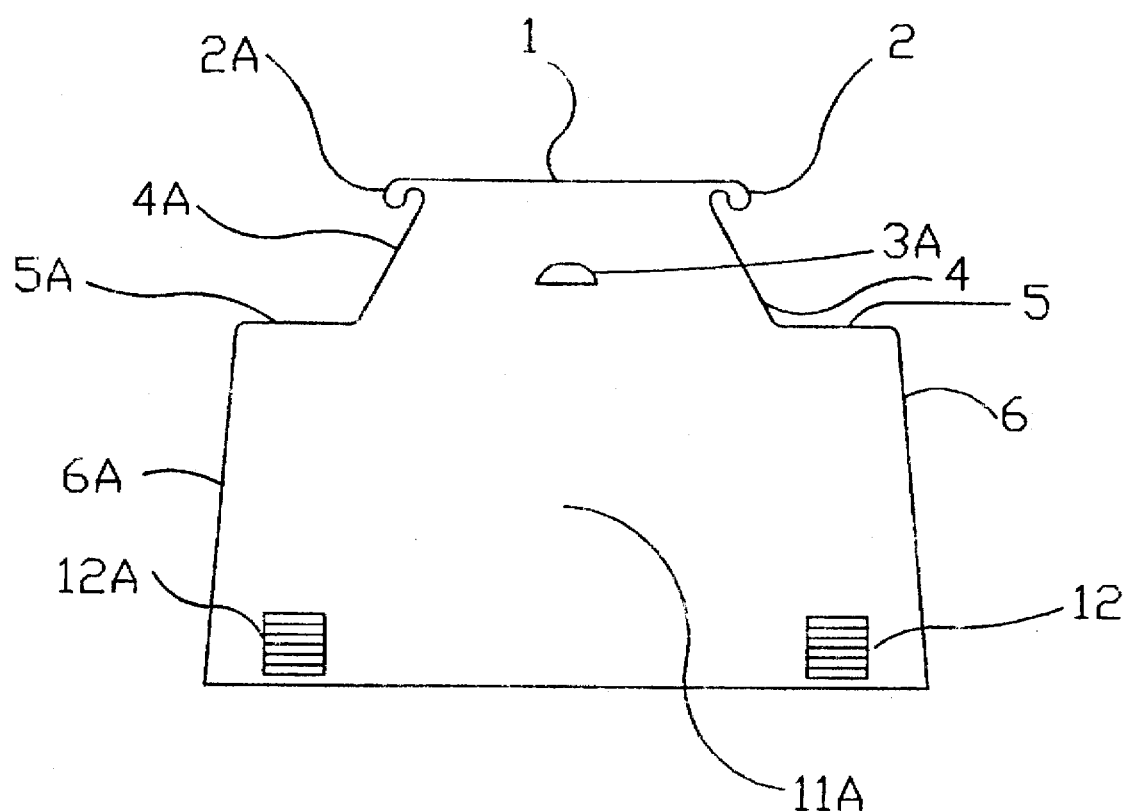
FIG. 3 is an isometric rear view of the grill covering.
Figure 4:
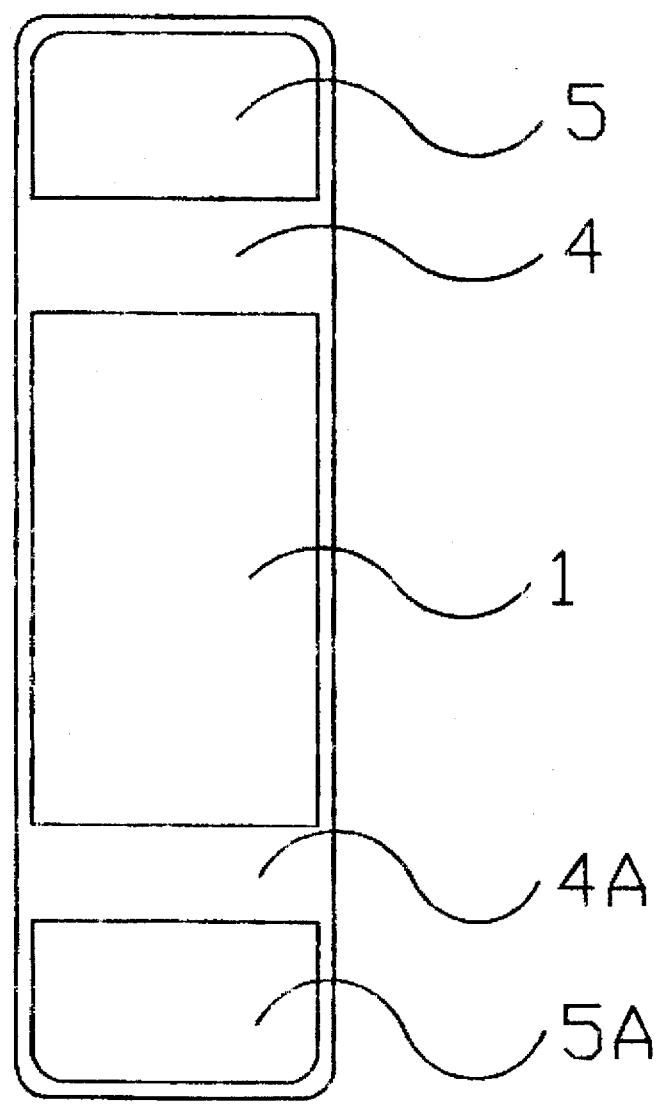
FIG. 4 is an isometric top view of the grill covering.

At the top of side base walls 6 and 6a are level planar surfaces 5 and 5a. Said level surfaces extend the width of base walls 6 and 6a and extend inward as indicated in FIGS. 1 and 3. Level planar surfaces 5 and 5a each encompass a depressed planar surface, the purpose thereof to provide an area for food preparation and/or service. FIGS. 2 and 4 demonstrate the structure of these depressed surfaces, although an altered size or shape would not depart from the scope of the present invention. The dotted lines in FIG. 2 indicate the recessed plane of the level planar surface 5. FIG. 2 can also be assumed to demonstrate the opposite side of the present invention and thereby indicates the shape of the recessed area in planar surface 5 as well. The shape of the recessed areas of planar surfaces 5 and 5a represented in FIG. 2 indicate the general shape of these recessed areas, although an altered shape would not depart from the scope of the present invention.

Extending upward at a slight grade from the inside edge of level planar surfaces 5 and 5a are walls 4 and 4a, respectively. Again, the grade allows for convenience in stacking, positioning, and transportation, and allows for the shape of the barbecue grill positioned therewithin. These walls extend to top wall 1 of the present invention.

Front base wall 11 and rear base wall 11a each include the following features: a rectangular vent in each bottom corner, as indicated in FIGS. 1 and 3, the purpose thereof to allow for the release of heat and gasses emitted by the grill positioned therewithin. Front base wall 11 contains vents 9 and 9a, and rear base wall 11a contains vents 12 and 12a. Also, base walls 11 and 11a include recessed handles 3 and 3a. Front base wall 11 contains handle 3, and rear base wall 11a contains handle 3a. FIG. 2 indicates the general shape of these handles, although an altered shape would not depart from the scope of the present invention.

Front base wall 11 has the following additional features separate from rear base wall 11a: a recessed vertical surface 8 with accompanying perimeter framework. This area is recessed enough to allow room for hooks 7a, 7b, 7c, and 7d. The number of hooks in recessed area 8 may vary without departing from the scope of the present invention. Likewise, the shape of said hooks, indicated best in FIG. 2, may vary without departing from the scope of the present invention. Further, while the overall intention of the present invention is that it be embodied in a one-piece structure, hooks 7a, 7b, 7c, and 7d may be separately connected to front base wall 11 without departing from the scope of the present invention. The purpose of said hooks is to provide an apparatus whereby the user may position various cooking utensils or other similar devices.

At the top of front base wall 11 and rear base wall 11a and side walls 4 and 4a extends level planar surface 1. This level planar surface functions as the top wall of the grill covering. In addition, it encompasses a recessed area, the purpose thereof to provide a surface for food preparation and/or service. The recessed area of level planar surface 1 is indicated in FIG. 4, although an altered size or shape would not depart from the scope of the present invention.

Extending along either sides of planar surface 1, at the top edges of side walls 4 and 4a, are handles 2 and 2a. Handle 2 is positioned at the top of side wall 4 and extends the width of said wall, and handle 2a is positioned at the top of side wall 4a and extends the width of said wall, as shown in FIG. 2. These handles are curved so that the user can easily grasp the handles, and the shape of this curve is indicated in FIGS. 1 and 3, although an altered shape would not deviate from the scope of the present invention.

The intended usage of the present invention is to conveniently cover and protect an outdoor grill. The method by which this usage can be attained is by grasping handles 2 and 2a or handles 3 and 3a and lifting the covering over the grill to be positioned therewithin. The covering is then to be positioned directly over said grill, and should rest on the surface on which the outdoor grill sets. To remove the covering, handles 2 and 2a or handles 3 and 3a are grasped, and the covering is lifted over the grill positioned therewithin. The lightweight structure of the covering is intended to provide ease in lifting the cover.

This description assumes that variations in size, shape, materials, form, assembly, and manner of operation are possible, and that all equivalent relationships to those illustrated in FIGS. 1 through 4 and described above are intended to be encompassed by the present invention. Likewise, as alterations may occur in the production of the present invention, it is not intended to limit the present invention to the exact design, construction, and operations described above. All modifications and alterations falling within the scope and purpose of the present invention are intended to be encompassed within the present invention.

It should be appreciated that a grill covering constructed in accordance with the concepts of the present invention, as described herewithin, accomplishes the objects of the present invention and thereby improves the art.

We claim:

1. A rigid, one-piece, lightweight, plastic or resin, multi-purpose grill covering for encompassing and protecting an outdoor barbecue grill, comprising:

a front base wall comprising a recessed handle, bottom corners with vents positioned therein, and a recessed vertical surface with accompanying framework and housing therewithin hooks for positioning cooking utensils;

a rear base wall comprising a recessed handle and bottom corners with vents positioned therein;

first and second inclined side base walls that extend between the front and rear base walls with a height approximately half the height of the front and rear base walls, the first and second inclined side base walls ending in first and second planar surfaces, respectively, that each include a recessed area to allow for food preparation and service;

first inclined side wall extending from an inside edge of the first planar surface;

a second inclined side wall extending from an inside edge of the second planar surface;

a top wall extending from a top edge of the front and rear base walls and the first and second inclined side walls and comprising a recessed planar area to accommodate food preparation and service; and curved handles at the top edge of the first and second side wall, running the width of the top wall, for providing an easy method of positioning the grill covering.

* * * * *